United States Patent [19]

Gierer

[11] Patent Number: 5,417,626
[45] Date of Patent: May 23, 1995

[54] ELECTRONIC-HYDRAULIC CONTROL DEVICE FOR TRANSMISSION SYSTEMS OF VEHICLES WITH AUTOMATIC GEAR CHANGE

[75] Inventor: Georg Gierer, Kressbronn, Germany

[73] Assignee: Zahnradfabrik Friedrichshafen AG, Germany

[21] Appl. No.: 681,570

[22] PCT Filed: Oct. 18, 1989

[86] PCT No.: PCT/EP89/01243

§ 371 Date: Apr. 25, 1991

§ 102(e) Date: Apr. 25, 1991

[87] PCT Pub. No.: WO90/04732

PCT Pub. Date: Mar. 5, 1990

[30] Foreign Application Priority Data

Oct. 26, 1988 [DE] Germany .......... 38 36 444.1

[51] Int. Cl.⁶ .......................... B60K 41/10
[52] U.S. Cl. .................... 477/117; 477/158
[58] Field of Search .......... 475/123, 127; 477/98, 477/117, 158

[56] References Cited

U.S. PATENT DOCUMENTS

| | | | |
|---|---|---|---|
| 4,658,705 | 4/1987 | Fujio | 91/518 |
| 4,691,594 | 9/1987 | Taga et al. | 477/158 |
| 5,078,028 | 1/1992 | Ishikawa et al. | 477/117 |
| 5,107,723 | 4/1992 | Yamashita et al. | 477/117 |
| 5,289,739 | 3/1994 | Muscaro et al. | 475/127 |

FOREIGN PATENT DOCUMENTS 2945315 5/1981 Germany .
3729627 3/1988 Germany .
1281040 7/1972 United Kingdom .

*Primary Examiner*—Dirk Wright
*Attorney, Agent, or Firm*—Davis, Bujold & Streck

[57] ABSTRACT

In an electronic-hydraulic control mechanism of an automatically shifting motorcar transmission, control valves (88, 70, 65, 67, 91 and 94) are coordinated with actuation devices (81 to 87) of hydraulically engageable and disengageable friction clutches or brakes (A to E1). The pressure level in one main pressure system of the control mechanism is regulated by a main pressure valve (29) while a control unit (72) designed as microprocessor controls the actuation devices via electrically actuated solenoid valves (41, 42 and 43) and pressure-control valves (38, 39 and 40) in accordance with operation parameters of the motorcar transmission and of a drive engine, the same as of a shift and/or travel program control. To provide an electronic-hydraulic control system in which the control operations develop under control, at low construction cost, the pressure control valves (38, 39 and 40) are situated in a first control system (36) of reduced pressure compared to the main pressure system (lines 25 and 34) through which they act with pilot control upon the control valves (65, 67, 70 and 94) and the main pressure valve (29) while the solenoid valves (41, 42, 43) are situated in a second control system (44) of likewise reduced pressure compared to the main pressure system, said solenoid valves (41, 42, 43) acting with pilot control upon shift valves (28, 30, 47) which control the feeding of pressurized fluid from the main pressure system to the pressure valves (65, 67, 70, 94).

11 Claims, 3 Drawing Sheets

| friction clutch or brake logic | | | | | | | |
|---|---|---|---|---|---|---|---|
| GG | A | B | C | D | E1 | E2 | F |
| G.R |  |  | ● |  |  |  | ● |
| G.N |  |  |  |  |  |  | ● |
| G.1 | ● |  |  |  |  |  |  |
| G.1P | ● |  |  |  |  |  | ● |
| G.2 | ● |  |  |  | ● | ● |  |
| G.3 | ● |  |  | ● | ● |  |  |
| G.4 | ● | ● |  |  | ● |  |  |
| G.5 |  | ● |  | ● | ● |  |  |

| | solenoid valve logic | | | pressure-control valve logic | |
|---|---|---|---|---|---|
| GG | 41 | 42 | 43 | 39 | 40 |
| G.R |  | ● |  |  |  |
| G.N | ● |  |  |  | ● |
| G.1 | ● |  |  |  |  |
| G.1P | ● |  |  |  | ● |
| G.2 | ● | ● |  | ● | ● |
| G.3 |  | ● |  | ● | ● |
| G.4 |  | ● |  |  |  |
| G.5 |  |  | ● | ● |  |

ELECTRONIC-HYDRAULIC CONTROL DEVICE FOR TRANSMISSION SYSTEMS OF VEHICLES WITH AUTOMATIC GEAR CHANGE

The invention concerns an electronic-hydraulic control mechanism of an automatically shifting motorcar transmission including, for shifting of specific speed levels, hydraulically engageable and disengageable friction clutches or brakes, a control valve being coordinated with each of their actuation devices, a main pressure valve that regulates the pressure level in a main pressure system and a control unit designed as microprocessor which, depending on operation parameters of the motorcar transmission and of a drive engine, can adjust the electronically actuated solenoid valves and pressure-control valves that control the actuation devices in the same manner whether shifting and/or program control.

An electronic-hydraulic mechanism of an automatically shifting motorcar transmission of the above mentioned kind has been disclosed in German Patent 29 45 315. This control system has two electromagnetically actuated pressure-control valves that regulate the buildup and reduction of pressure on the actuation devices of the friction clutches or brakes, the pressure-control valves in the main pressure system being inserted after the main pressure valve. Said pressure-regulating valves take care of a regulated buildup or reduction of pressure in the actuation device of the friction clutch or brake to be engaged or disengaged at a given time. For this purpose, a valve unit is coordinated with each actuation device consisting of an electro-magnetically actuated shift valve and two reversing valves actuated by the working pressure. At any given time during the engaging or disengaging operation, pressurized fluid is fed to the actuation device or drained from the actuation device via the corresponding pressure-control valve by means of the reverse valves. After this shifting operation with regulated buildup or reduction of pressure in the actuation devices, the reverse valves reach a position in which, bypassing the pressure-control valves, they create a connection between the respective actuation device and the main pressure system or a tank connection since there is coordinated with each actuation device a corresponding valve unit consisting of shift valve and reverse valves, said electronic-hydraulic mechanism of an automatically shifting motorcar transmission has the disadvantage of an elevated construction cost.

Therefore, the invention is based on the problem of reducing, in an electronic-hydraulic control mechanism of an automatically shifting motorcar transmission, the construction cost for a regulated pressurization and a regulated pressure reduction in the actuation devices of the friction clutches or brakes.

In an electronic-hydraulic mechanism of the kind mentioned above, this problem is solved by the fact that the pressure-control valves are situated in a first control system of reduced pressure compared to the main pressure system and through which they act with pilot control upon the control valves and the main pressure valve, and the solenoid valves are situated in a second control system also of reduced pressure as compared to the main pressure system, said solenoid valves acting with pilot control upon shift valves which control the supply of pressurized fluid from the main pressure system to the control valves and a reverse locking valve.

All shifting operations and the adjustment of the pressure level in the main pressure system are thus carried out with regulation. Aside from the fact that a control valve is coordinated with each actuation device, the remaining hydraulic structural elements, such as solenoid valves and shift valves, can assume multiple functions.

Other advantageous embodiments of the invention are described in claims 2 to 11. According to claim 2 a pressure-control valve, which controls a discharge proportionally to the current, is situated in a control line of the first control system through which the main pressure valve, depending on the engine torque, can be relieved of pressure on its spring-loaded face end in a manner such that, by means of the main pressure valve, the required system pressure of the main pressure system is adjustable for each operating condition and during a starting operation of the motorcar transmission (N-D1) or (N-R), resulting in a regulated pressure buildup in the actuation devices of the friction clutches or brakes to be engaged in the speed levels concerned. The pressure-control valve thus simultaneously assumes the function of a pressure modulation, dependent on the torque of the engine, and of a control of the starting operation. Therefore, it is possible to eliminate a separate pressure-modulation valve and special shift valves for the starting operation.

In addition, according to claim 3, a second and a third pressure-control valve, at a minimum, should at a given time contribute, proportionally to the current, to a discharge of a pilot control line connected therewith of a first control system during an actuation operation, piston slide valves of the control valves being movable on their face end opposite a spring under the pressure of the pilot control line concerned. With these pressure-control valves acting upon the control valves it is possible to carry out all shifting operations under control. The pressure-control valves are controlled via the control unit designed as microprocessor which, depending on the engine torque and the engine speed gradients, releases a corresponding current on the pressure-control valves actuated at a given time. Thus, it is possible through errors detected by the control unit which are due to changed regulation variables on the pressure-control valves to follow up the control valves so as always to obtain uniform shifting operations.

Furthermore, according to claim 4, the shift valves must be situated in pilot control lines through which the pilot control line concerned is shiftable to a pressureless state. Due to this shift position of the shift valves obtained via the corresponding solenoid valve, speed levels are hydraulically locked in respect to each other, that is, control lines leading to control valves whose actuation devices are not to be pressurized are pressurelessly shifted by the shift valves.

According to claim 5, for an electronic-hydraulic control mechanism having at least one shut-off valve which upon change of the speed levels controls the reduction of the actuation pressure of the friction clutch or brake to be disengaged, it is provided that said shut-off valve whose piston slide valve is pressurized on one face with actuation pressure of the actuation device of the friction clutch or brake to be engaged, be pressureable on it opposite face from a pilot control line with a control pressure regulated by an electric pressure-control valve in a manner such as to be converted under control into a position that interrupts the discharge of pressurized fluid from the actuation device. During an intersecting shift by means of said shut-off valves and of the control valves to be actuated a certain load-transfer point is obtained under control where, upon reaching a certain synchronous speed, the transferred torque diminishes on one clutch or brake and increases on the clutch or brake engaged.

According to another embodiment of the invention stated in claim 6, the electric pressure-control valve that regulates the shut-off valves is regulatable by a temperature sensor in accordance with the temperature of the lube oil in the motorcar transmission. In this manner the shift jolt that occurs due to viscosity of the transmission oil at temperatures below 0° C. can be prevented.

It is further provided, according to claim 7 that, depending on the torque to be transmitted at a given moment through the coordinated friction clutch or brake, the control valves have different face ends pressurizable by the pilot control pressure. At the same time, according to claim 8, the control characteristic of control valves actuatable at a given time into upper and lower speed levels is changeable by actuating the control valve into the upper speed level on the circular face end thereof and into the lower speed level on the circular face end and a ring shaped actuation surface, based on the torque to be transmitted to the respective friction clutch or brake.

According to claim 9, each pressure control valve within the first control system is to be coordinated with a hydraulic spring accumulator damper for reducing the pressure vibrations. Such pressure vibrations can appear, depending on the construction of the pressure-control valve, during the (up and down) control of the valve bodies thereof and lead to undesirable shift positions of the control valves and shut-off valves.

For providing a condition of safety, according to claim 10, the electronic-hydraulic mechanism of the invention, has shift valves and control valves which are moved only by spring tension to the position corresponding to a high speed level. Such a safety device would prevent the occurrence of an undesirably high engine brake torque when the control mechanism fails due to downshift of the motorcar transmission to a lower speed level.

Finally, according to claim 11 it is provided that there be attached to the control unit a device for monitoring errors of an ignition or injector system of the drive engine and/or a device for monitoring an antiblocking system of the motorcar, which indicate errors in the ignition or injector system and/or an operation of the antiblocking system to the control unit, wherein upon occurrence of the error signal and of the other parameters vehicle speed v=0 or v=smaller than one lower limit value and/or of the signal of the antiblocking system, at least one control valve is adjusted by means of its coordinated solenoid valve or pressure-control valve in a manner such that the motorcar transmission is idle at least by phases. The monitoring of the ignition and injector system and the adjustment of the motorcar transmission to idle must prevent the unintentional start and shifting to other speed levels of the motorcar transmission which can occur as the result of a defect in the electric installation upon an automatic speed increase of the drive engine. A shift of the motorcar transmission to idle during operation of the antiblocking system has the advantage in that there is no drive torque available on the vehicle gears whereby the braking behavior of the motorcar is considerably improved.

The invention is not limited to the combination of features of the claims. Other logical possible combinations may result from the claims and embodiments discussed herein.

For further explanation of the invention reference is had to the drawings in which two embodiments are shown in simplified manner.

Figures 1, 2, 5:
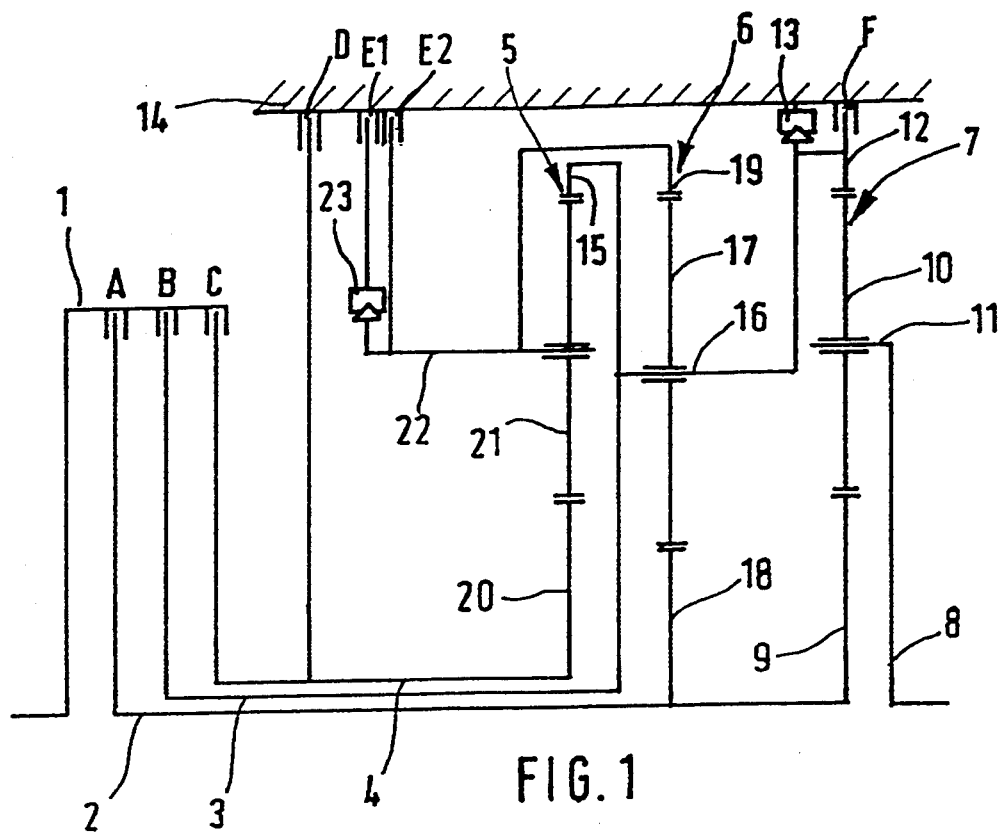
FIG. 1 is a diagrammatic illustration of a motorcar transmission shiftable by means of a control mechanism designed according to the invention.
FIG. 2 is a table of the friction clutches and brakes actuated to the specific speeds.
FIG. 5 is a table of the solenoid valves and pressure-control valves actuated to the specific speed levels.

In FIG. 1 an input shaft 1 is driven by the drive engine of the motorcar via a hydrodynamic torque selector (not shown) and via clutches A, B and C optionally frictionally connected with drive shafts 2, 3 and 4. In additional, the motorcar transmission has planetary gear sets 5, 6 and 7 and an output shaft 8. The drive shaft 2, which is frictionally connectable via the clutch A with the input shaft 1, accommodates a sun gear 9 of the third planetary gear set 7. Planet gears 10, which mesh with said sun gear 9, are situated upon a web 11 fixedly connected with the output shaft 8. There further belongs to said planetary gear set 7 a ring gear 12 which can be secured to a transmission housing 14 via a friction brake F or a free-wheel clutch 13. The drive shaft 3 which is attachable to the input shaft 1 via the friction clutch B is connected with an external central gear 15 of the planetary gear set 5, a planetary carrier 16 of the planetary gear set 6 and the ring gear 12 of the planetary gear set 7. The planetary carrier 16 accommodates the planetary gears 17 that on one side are engaged with an internal central gear 18 fixedly situated upon the drive shaft 2 and on the other side with a ring gear 19. The drive shaft 4 operatively connected with the input shaft 1 via the friction clutch C can be secured to the transmission housing 14 via a friction brake D and in addition accommodates a sun gear 20 of the planetary gear set 5. Said sun gear 20 meshes with planetary gears 21 which are situated on a spider shaft 22. The spider shaft 22 can be braked with the transmission housing 14 via a freewheel clutch 23 and a friction clutch E1. Parallel with the free-wheel clutch 23 and the friction clutch E1 and between the spider shaft 22 and the transmission housing 14 is situated another friction brake E2. In addition, the spider shaft 22 is connected with the ring gear 19 of the planetary gear set 6.

To explain the power flow that takes place within the specific speed levels, reference is had to the table represented in FIG. 2 where the respectively actuated friction clutches or brakes are coordinated with the specific speed levels. In a first speed level, in which the brake torque of drive engine that drives a motorcar transmission is not utilized, only the friction clutch A is engaged. Only the planetary gear set 7 here takes part in the power flow. The drive power flows from the input shaft 1 via the friction clutch A, the drive shaft 2, the sun gear 9 and the planetary gears 10 directly toward the web 11 which is connected with the output shaft 8. Since the ring gear 12 is supported on the transmission housing 14 via the free-wheel clutch 13, the motorcar transmission has a free-wheel effect in this first speed level.

It is also possible to shift a first speed level in which the brake torque of the drive engine can be utilized. In this case the friction brake F, shifted in parallel with the free-wheel clutch 13 is actuated. This speed level is designated as 1P in the table.

In a second speed level of the motorcar transmission the friction clutch A is likewise engaged and, in addition, the friction brakes E1 and E2 are actuated, with the friction brake E1 assuming a pre-selector position for the third speed that follows. The translation and the power flow are determined here by the planetary gear sets 6 and 7. Part of the drive shaft power flows via the internal central gear 18 and the planetary gears 17 toward the planetary carrier 16. The other part of the power takes its path over the sun gear 9 and the planetary gears 10 and in the web 11 joins the first power branch.

In the third speed level the friction brakes D and E1 are actuated together with the engaged friction clutch A. Therefore, all three planetary gear sets 5, 6 and 7 take part in forming said speed level. Due to the power introduction in the sun gear 9 and in the internal central gear 18 and the support on the sun gear 20, the power flows toward the output shaft 8.

In the fourth speed level the friction clutch B and the friction clutch E1 situated between the free-wheel clutch 23 and the transmission housing 14 are shifted together with the additionally actuated friction clutch A. Here, the friction clutch E1 assumes a pre-selector position for the fifth speed that follows. The power flows distributed via both friction clutches A and B toward the sun gear 9 and the ring gear 12 of the planetary gear set 7 on the web 11 of which the power branches join again.

The fifth speed is shifted by actuating the friction clutch B and the friction brakes D and E1. In the power flow all three planetary gear sets 5, 6 and 7 are again included. At this speed the drive shaft 3 drives, on one hand, via the planetary carrier 16 into the planetary gear set 6 as well as via the ring gear 12 into the planetary gear set 7 while the drive shaft 3 drives via the external central gear 15 into the planetary gear set 5 whose sun gear 20 rests over the friction brake D.

In the reverse gear the friction clutch C is engaged and the ring gear 12 of the planetary gear set 7 is braked with the transmission housing 14. As a result of this introduction of driving power coupled with the support on the planetary gear set 7, a negative power distribution is produced with a changed direction of rotation on the web 11 and thus on the output shaft 8.

In a neutral position of the motorcar transmission no driving power is transmitted, therefor only the friction brake F is actuated.

Figure 3:
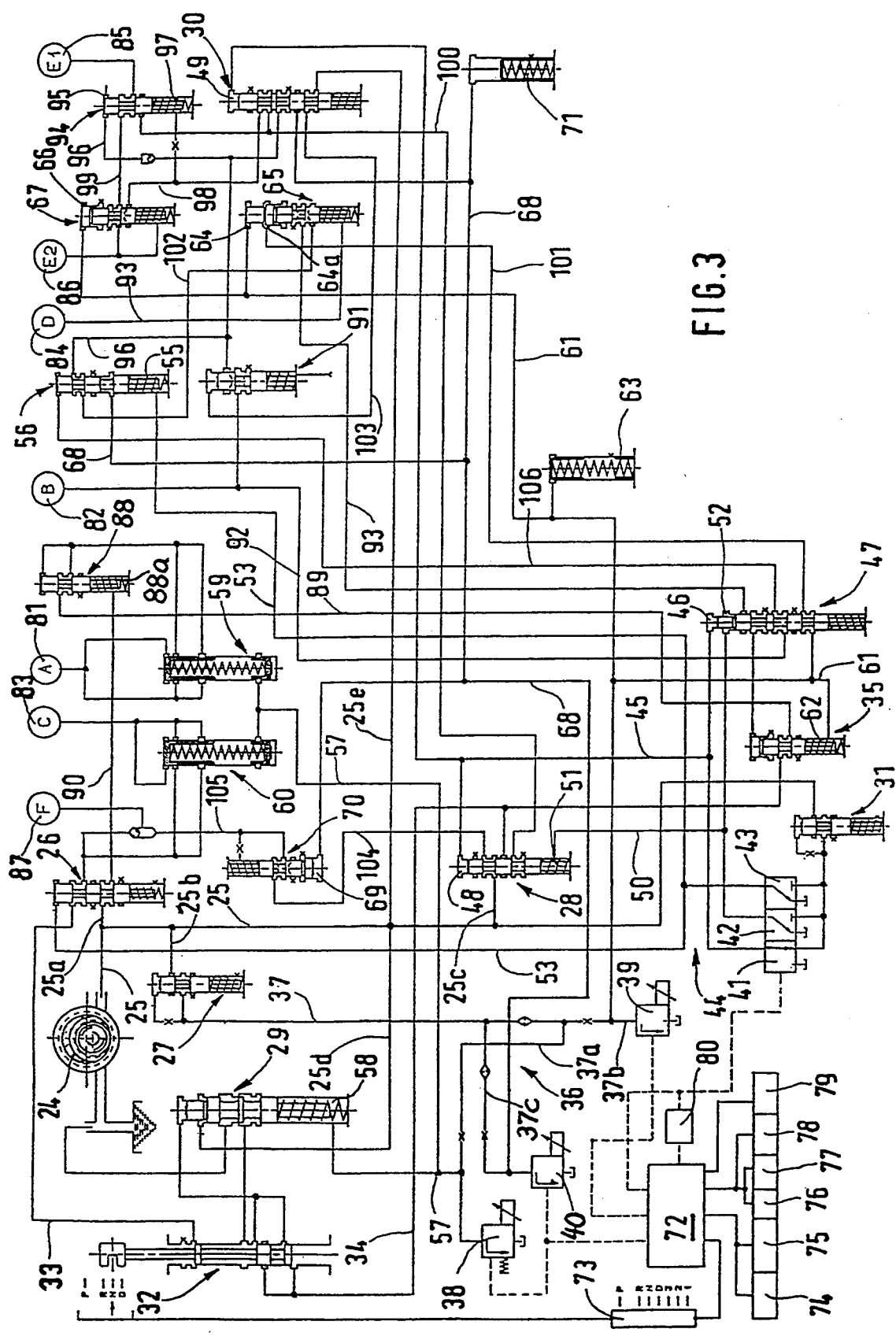
FIG. 3 is a control diagram of the control mechanism according to the invention shown in simplified manner.
Figure 4:
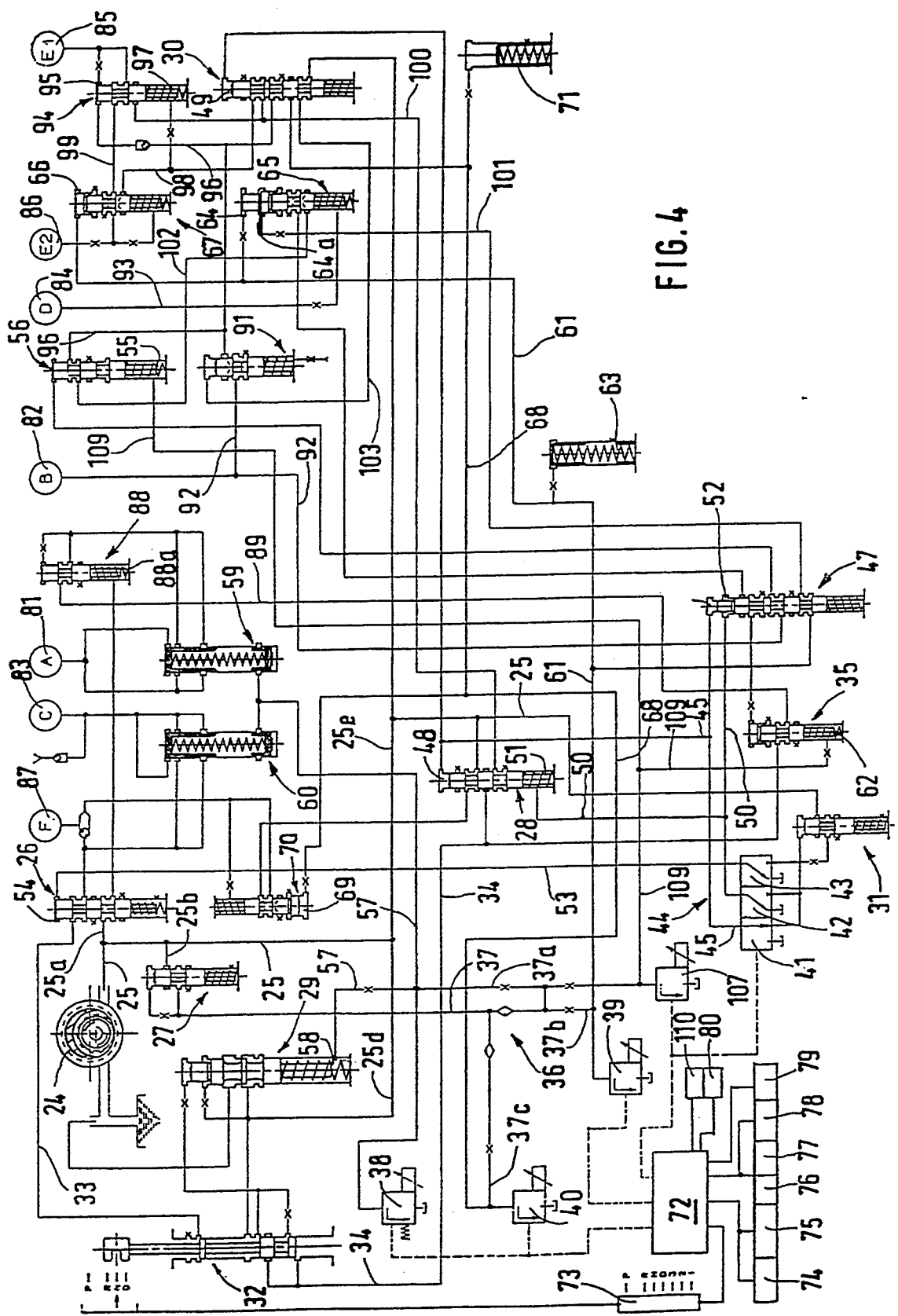
FIG. 4 is a control diagram essentially coinciding with the arrangement of FIG. 3 and in which is provided an additional pressure-control valve actuated in accordance with the temperature of the transmission oil.

In FIGS. 3 and 4, which show the control diagram of an electro-hydraulic control system for shifting of the transmission as explained in FIG. 1, a hydraulic pump, designated by a 24, which passes pressurized fluid to a main pressure system via a main line 25 and via the legs branching therefrom: 25a to a reverse locking valve 26, 25b to a first pressure-reducing valve 27, 25c to a shift valve 28 (only in FIG. 3), 25d to a main pressure valve 29, 25e to a shift valve 30, and which is finally attached to a pressure-reducing valve 31. The system pressure is regulated by means of the main pressure valve 29, via the leg 25d of the main pressure system, it is possible to pressurelessly remove pressurized fluid from said leg. The leg 25d is also attached to a selector slide valve 32 from which the leg 25d in a position R conveys pressurized fluid via a line 33 to the reverse locking valve 26 and in a position D, which corresponds to its position for the forward gears 1 to 5, conveys pressurized fluid to a line 34. Said line 34 is attached to the shift valve 28 and a shut-off valve 35.

The pressure-reducing valve 27 adjusts a control pressure of a first control system 36. Said first control system 36 has a main control line 37 starting from which a throttled control leg 37a leads to a first electric pressure-control valve 38. In addition, a control leg 37b, likewise throttled branches off from the main control line 37 leading to a second electric pressure-control valve 39. Finally, the main control line 37 is also connected throttled with a third electric pressure-control valve 40 via a control leg 37c.

Attached to the pressure-reducing valve 31 are solenoid valves 41, 42 and 43 which control a second control system 44. Said solenoid valves 41, 42 and 43 are, according to their function, 3/2-directional valves individually actuated via electro-magnets, not designated in detail. From the first solenoid valve 41, a control line 45 leads to a face-end pilot control space 46 of a shift valve 47, to the pilot control space 48 of the shift valve 28 and to a pilot control space 49 of the shift valve 30. The second solenoid valve 42 adjusts the pilot control pressure in a control line 50. Said line 50 exerts a pilot control effect on a spring-loaded face end 51 of the shift valve 28 and on an annular pilot control space 52 of the shift valve 47.

Finally, the solenoid valve 43 is attached via a control line 53 to a face-end pilot control space 54 of the reverse locking valve 26 and to a spring-loaded control space 55 of a shut-off valve 56 (only in FIG. 3).

In the control leg 37a of the first control system 36, the pressure level is adjusted on a pilot control line 57 via the electric pressure-control valve 38, which proportionally to the current controls a discharge to the tank. Said pilot control line 57 leads to a spring-loaded face end 58 of the main pressure valve 29. Alternately, the pilot control line 57 is also attached to spring accumulator dampers 59 which are respectively coordinated with the friction clutches A and C.

From a throttled section of the control leg 37b controllable via the pressure-control valve 39, the first control system 36 provides a pilot control line 61 which is attached to a face-end spring space of the shut-off valve 35 (only in FIG. 3), to the shift valve 47, to a spring accumulator damper 63, to a pilot control space 46 and an annular piston area 64a of a control valve 65 coordinated with the friction clutch B, and to a face-end control space 66 of a control valve 67, which is coordinated with the friction brake E2.

The third pressure-control valve 40 controls the pressure in a pilot control line 68. Said pilot control line 68 is connected with a pilot control space 69 of a control valve 70 spring-loaded on the other side, which controls the actuation of the friction brake F, with a controlled terminal of the shut-off valve 56 (only in FIG. 3), with a controlled terminal of the shift valve 30 and with a spring accumulator damper 71.

The control mechanism also has a control unit 72 designed as microprocessor to which the motorcar driver can feed, via a shift program control 73, certain shift strategies dependent on load and speed. Also attached to the control unit are measured-value sensors for the following operating parameters of the drive engine that is not shown: An engine torque sensor 74, a throttle valve sensor 75 and speed sensors 76 and 77 for the speed of the drive engine and output speed of the motorcar transmission, the same as the speed of a turbine, not shown, of the hydrodynamic torque converter. Finally, transmitting elements are also attached to the control unit 72 of which one is designed as travel program control 78 and the other as error detector 79, which determine the errors in the ignition and injector system of the drive engine. There is further attached to the control unit 72 a monitoring device 80 which transmits to the control unit 72 operating signals of an antiblocking system not shown.

The control unit, based on the input data and operating parameters, controls the functions of the pressure-control valves 38, 39 and 40 and of the solenoid valves 41, 42 and 43, by a certain control current being fed to said valves by the control unit 72. An actuation device, not shown in detail, which will be designed as hydraulic adjusting drive, not shown in detail, is coordinated with each one of the friction clutches and brakes. In the diagram these actuation devices are shown only symbolically as a circuit in which the friction clutch or brake actuatable at a given time is indicated, resulting with the following coordination of the actuation devices with the friction clutches or brakes:

actuation device 81 for friction clutch A
actuation device 82 for friction clutch B
actuation device 83 for friction clutch C
actuation device 84 for friction brake D
actuation device 85 for friction brake E1
actuation device 86 for friction brake E2
actuation device 87 for friction brake F.

There has been previous mention control valves 67 and 79 that control the actuation devices 86 and 87. There is further provided a control valve 88 which, starting from the shut-off valve 35, can be actuated with pressurized fluid via a system pressure line 89. On the other side, said control valve 88 is actuated on a spring-loaded face end, starting from the reverse locking valve 26, with system pressure. Furthermore, a control valve 91 is coordinated with the actuation device 82 of the friction clutch B.

The control valve 91 is connected via a line 92 with the actuation device 82 and with a controlled terminal of the shift valve 47. The actuation device 84 of the friction brake D is connected via a line 93 with the control valve 65 and the shift valve 47. The actuation device 85 is coordinated with a control valve 94 which is attached on a face-end pilot control space 95 to a line 96 connected with the shift valve 30, the control valve 91 and the shut-off valve 55. A spring space 97 of the control valve 94 opposite to said pilot control space 95 is connected via a line 98 with the control valve 67 and the shift valve 30. Finally, lines 99 and 100 also lead from the control valve 94 to the control valve 67 and from the control valve 94 to the shift valves 30 and 28. The control valve 65 coordinated with the friction brake D is connected via lines 101 and 102 with the shift valve 47 and the shut-off valve 56. There further exists, via a line 103, a communication between the shift valve 30 and the control valve 91.

To further explain the mode of operation of the control system according to the invention, which results from FIG. 3, reference is also drawn to FIG. 5 in which the shift logic of the solenoid valves and pressure-control valves in relation to the specific speed levels is set.

In a level N of the motorcar transmission in which said motorcar transmission is in its neutral position, all valves assume the position shown in FIG. 3. The solenoid valve 41 and the pressure-control valve 40 are actuated so that a pressure buildup takes place in the pilot control line 68 of the first control system 36 and in the control line 45 of the second control system 44. Due to the pressure in the control line 45, the shift valve 28 is moved to a position in which it connects the line 104 with the main line 25. Being actuated by the pressure-control valve 40, the control valve 70 is in a position in which it connects the lines 104 and 105 with each other. Pressurized fluid from the main pressure system is thus fed to the actuation device 87 of the friction clutch F.

If the selector slide valve 32 is displaced from its position N to the position D, pressurized fluid from the leg 25d, whose pressure is regulated via the main pressure valve 29, now reaches the line 34. In the passage from N to D, the pressure-control valve 38 is controlled via the control unit 72 so that the pressure on the spring-loaded face end 58 of the main pressure valve 29 is reduced. From the line 34 that conveys system pressure, the pressurized fluid arrives via the shut-off valve 35 at the system pressure line 89 from which it is fed to the actuation device 81 of the friction clutch A. The pressure-control valve 38 acting upon the main pressure valve 29 and both spring accumulator dampers 39 and 60 regulates the pressure build up in the actuation device that takes place here. After the shift of gear has been effected, the motorcar transmission is in a first speed level in which the free-wheel clutch 13 and the friction clutch A are active.

In a speed level 1P the solenoid valve 41 and the pressure-control valve 40 are actuated. In said speed level there can be utilized in the first gear the engine brake torque, for example, when traveling over runway drops. For this purpose, the friction brake F connected in parallel with the free wheel clutch 13 must be actuated while preserving the engagement of the friction clutch A. The activation of the pressure-control valve 40 leads to an increase in pressure in the pilot control line 68 whereby the control valve 70 is moved to a position in which it supplies the actuation device 87 of the friction brake F from the main line 25 and the open shift valve 28, as well as lines 104 and 105.

In a second speed level, the solenoid valves 41 and 42, as well as pressure-control valves 39 and 40, are actuated. Since a pressure buildup takes place on the spring-loaded face end 51 of the shift valve 28 over the second control system 44 by means of the solenoid valve 42 and the control line 50, the actuation device 87 of the friction brake F becomes empty, whereby the friction brake F is disengaged. The friction clutch A remains engaged while the actuation devices 85 and 86 of the friction brakes E1 and E2 are actuated in the following way: Via the line 100, which is supplied with system pressure from the line 34 by means of the shift valve 28, the pressurized fluid reaches the line 98 via the shift valve 30. The control valve 67 is moved to its lower position due to loading of its face-end control space with pilot control pressure of the pressure-control valve 39 so that pressurized fluid from the line 98 can reach the actuation device 86 and via the line 99 and the control valve 94 reach the actuation device 85, and at the same time engage both friction brakes E1 and E2.

In the upshift from the second to the third speed level, the solenoid valve 41 is shut off while the solenoid valve 42 and the pressure-control valves 39 and 40 are further actuated. The consequence of this is that the pressurizing of both actuation devices 85 and 86 is pressurelessly shifted via the shift valve 30, since the pressure in the pilot control space 49 of the shift valve 30 has been diminished over the open solenoid valve 41. In addition, however, pressurized fluid is fed to the friction brake E1 from the line 100. The actuation device 84 of the friction brake D is pressurized starting from the line 100 via line 96, the shut-off valve 56, line 102, the control valve 65 and line 93. The valves 65 and 56 already assume this position in the engaging position of the second speed level, the shifting being produced only by shutting off the solenoid valve 41 through which the shift valve 30 reaches its N position adjusted by spring tension. Taking into consideration the brake torque to be transmitted from the friction brake D, a reinforced actuation power acts upon the control valve 65 during this change of gear. At the same time the pilot control space 64 as well as the annular piston area 64a are actuated with pressure from the pilot control line 61.

For passing the motorcar transmission from its speed level 3 over to the speed level 4, both pressure-control valves 39 and 40 are shut off. In addition, the friction clutch A is engaged, while the friction clutch B instead of the friction brake D is to be engaged. The shutting-off of both pressure-control valves 39 and 40 results in the pilot control pressure diminishing on the control valves 65, 67 and 70 over the lines 61 and 68. Pressurized fluid reaches the line 100 from the system pressure line 34 via the shift valve 28 moved under pressure of the line 50, and then via the shift valve 30, the line 96 and the control valve 91 opened under spring tension the fluid reaches the line 92 that leads to the actuation device 82 of the friction clutch B. This pressure that builds up in the line 92 propagates via the shift valve 47 to the line 106, which acts on the face end of the shut-off valve 56. Thus, the shut-off valve 56 acting simultaneously with the pressure increase in the actuation device 82 steers the actuation device 84 into its disengaged position.

From the speed level 4 to the speed level 5 the friction clutch A is disengaged and the friction brake D engaged. To this end the solenoid valve 42 is switched off and the solenoid valve 43 switched on. The pressure-control valve 39 in turn builds up a pressure in the pilot control line 61. Starting from the line 100 there builds up in turn in the line 96 a system pressure which can now propagate to the line 102 via the shut-off valve 56 opened by the solenoid valve 43. Starting from the line 102, the pressurized fluid reaches the line 93 via the control valve 65 opened by the pressure-control valve 39 and thus the actuation device 84 of the friction brake D. In this shift, contrary to the shifting operation from speed level 2 to speed level 3, the control pressure of the first control system 36, that is, of the pilot control line 61, acts via the shift valve 47 exclusively on the pilot control space 64 of the control valve 65, since the torque to be transmitted in this shift is smaller than in the shift from speed level 2 to 3 in which the friction brake D was likewise switched on. The friction clutch A is disengaged in this shifting operation, since the solenoid valve 43 builds up pressure on the face end on the reverse locking valve 26 via the control line 53, and thus moves the reverse locking valve to a position in which the latter produces a changed position of the control valve 88 in a manner such that the actuation device 88 of the friction clutch A is filled only to an extent where no torque can be transmitted.

Finally, the reverse gear is shifted departing from the neutral position N of the selector slide valve 32 toward R, with only the solenoid valve 42 being actuated. Pressurized fluid with system pressure arrives from the leg 25d of the main line, via the selector slide valve 32, at the line 33 and from there, via the reverse locking valve 26, at the actuation device 87 of the friction brake F and, via the spring accumulator damper 60, at the actuation device 83 of the friction clutch C. In this starting operation from N to R, the pressure buildup in the actuation devices 83 and 87 is also regulated by the controlling pressure-control valve 38.

In the embodiment of FIG. 4, there is provided a fourth pressure-control valve 107 which is attached to the main control line 37 via a control line 108. Here a pressure-regulated pilot control line 109 leads to the face-end spring space 62 of the shut-off valve 35 and to the spring-loaded control space of the shut-off valve 56. Thus, the pilot control line 109 controlled via the pressure-control valve 107 is connected instead of the pilot control line 61 and instead of the control line 53 of the embodiment of FIG. 3. A temperature sensor 110 detects the lube oil temperature in the motorcar transmission and feeds the corresponding values to the control unit 72. Said control unit 72 controls the position of the pressure-control valve 107 and therewith the pilot control pressure acting upon both shut-off valves 35 and 56. Thereby the free-wheel point can be changed during shifting via the electronic system depending on the state of viscosity of the lube oil so that shockless changes of gear result therefrom.

REFERENCE NUMERALS

A friction clutch
B friction clutch
C friction clutch
D friction brake
E1 friction brake
E2 friction brake
F friction brake
1 input shaft
2 drive shaft
3 drive shaft
4 drive shaft
5 planetary set
6 planetary set
7 planetary set
8 output shaft
9 sun gear of 7
10 planetary gears of 7
11 web of 7
12 ring gear of 7
13 free-wheel clutch
14 transmission housing
15 external central gear of 5
16 planetary carrier of 6
17 planetary gears of 6
18 internal central gear of 6
19 ring gear of 6
20 sun gear of 5
21 planetary gears of 5
22 spider shaft of 5
23 free-wheel clutch
24 hydraulic pump
25 main line 25a leg to 26
25b leg to 27
25c leg to 28
25d leg to 29
25e leg to 30
26 reverse locking valve
27 pressure-reducing valve
28 first shift valve
29 main pressure valve
30 shift valve
31 second pressure-reducing valve
32 selector slide valve
33 line between 32 and 26
34 line between 32, 28 and 35
35 shut-off valve
36 first control system
37 main control line
37a control leg for 38
37b control leg for 39
37c control leg for 40
38 first pressure-control valve
39 second pressure-control valve
40 third pressure-control valve
41 first solenoid valve
42 second solenoid valve
43 third solenoid valve
44 second control system
45 control line of 41 on 28, 47 and 30
46 pilot control space of 47
47 shift valve
48 pilot control space of 28
49 pilot control space of 30
50 control line from 42 to 47 and 28
51 spring-loaded face end of 28
52 annular pilot control space of 47
53 control line from 43 to 26 and 56
54 face-end pilot control of 26
55 spring loaded control space of 56
56 shut-off valve
57 pilot control line of 38
58 spring loaded face end of 29
59 spring accumulator damper
60 spring accumulator damper
61 pilot control line of 39
62 face end spring space of 35
63 spring accumulator damper
64 pilot control space of 65
64a annular piston area of 65
65 control valve for D
66 face-end control space of 67
67 control valve for E2
68 pilot control line of 40
69 pilot control space of 70
70 control valve for F
71 spring accumulator damper
72 control unit
73 shift control
74 engine torque sensor
75 throttle valve sensor
76 speed sensor $N_{Mot}$
77 speed sensor $N_{transmission}$
78 travel program control
79 error detector
80 monitoring device
81 actuation device for A
82 actuation device for B
83 actuation device for C
84 actuation device for D
85 actuation device for E1
86 actuation device for E2
87 actuation device for F
88 control valve for A
88a spring-loaded face end of 88
89 system pressure line
90 line between 26 and 88
91 control valve for B
92 line between 91, 82 and 47
93 line between 47, 65 and 84
94 control valve for E1
95 pilot control space of 94
96 line between 94, 30, 91 and 56
97 spring space
98 line between 94, 67 and 30
99 line between 94 and 67
100 line between 94, 30 and 28
101 line between 65 and 47
102 line between 65 and 56
103 line between 30 and 91
104 line between 28 and 70
105 line between 26 and 60
106 line between 47 and 56
107 fourth pressure-control valve
108 control line
109 pilot control line
110 temperature sensor

I claim:

1. An electronic-hydraulic control mechanism, for a vehicle having an automatically shifting transmission, comprising:
a transmission shifting mechanism having a plurality of hydraulically engagable and disengagable components (A, B, C D, E1, E2 and F), each of said plurality of engagable and disengagable components being connected to a corresponding actuation device (81, 82, 83, 84, 85, 86, and 87), each of said actuation devices being hydraulically connected to a shift control valve (65, 67, 70, 88, 91 and 94), and each of said shift control valves (65, 67, 70, 88, 91, and 94) being connected to at least one of a plurality of pressure control valves (38, 39, 40), a plurality of shift valves and a plurality of electrically actuated solenoid valves (41, 42, 43);
said solenoid valves (41, 42, 43) and said pressure control valves (38, 39, 40) being electrically connected to a central control unit (72), and said central control unit, depending on operation parameters of the transmission and on operation parameters of an engine, controlling said solenoid valves (41, 42, 43) and said pressure control valves (38, 39, 40) to select a desired gear of the transmission;
a main pressure control valve (29) for regulating a main pressure in a main pressure system (lines 25 and 34), said main pressure system being hydraulically connected to at least one of said shift valves and said shift control valves for supplying pressurized fluid thereto;
wherein said pressure control valves (38, 39, 40) are situated in a first secondary hydraulic control system (36) which has a pilot pressure that is of a reduced pressure compared to said main pressure (lines 25 and 34), said pressure control valves (38, 39, 40) are controlled by said central control unit (72) to supply pilot pressure to desired ones of said shift control valves and control supply of main pressurized fluid through said shift control valves (88, 91, 65, 67 and 94) to said actuation devices (81, 82, 83, 84, 85, 86, and 87); and said solenoid valves (41, 42, 43) are situated in a second secondary control system (44) which has a pilot pressure that is of a reduced pressure compared to that of the said main pressure (lines 25 and 34), and said solenoid valves are controlled by said central control unit (72) to supply pilot pressure to desired ones of said shift valves and control supply of pressurize fluid through said shift valves to said shift control valves (65, 67,70, 94, and 88).

2. An electronic-hydraulic control mechanism according to claim 1, wherein a first of said pressure control valves (38) is hydraulically connected to a pressure relief valve (27) that is located in said main pressure system for controlling discharge of fluid from said main pressure system and regulating a pressure buildup in said actuation devices (81, 83, 87) for desired ones of said plurality of hydraulically engagable and disengagable components.

3. An electronic-hydraulic control mechanism according to claim 1, wherein each said shift control valves (65, 67, 70, 91) comprises a valve piston which is slidably mounted in a cylinder and spring biased into a position in which said valve piston blocks flow of main pressurized fluid through said shift control valve to and from said actuation device; and a second and a third of said pressure control valves (39 and 40) are each hydraulically connected, via pilot control lines (61, 68), with said cylinders of each said shift control valves and communicate with a side of said valve piston opposite said spring bias to move said valve piston against said spring bias to a position in which said valve piston permits pressurized fluid to flow to and from a desired one of said actuation devices.

4. An electronic-hydraulic control mechanism according to claim 3, wherein said shift valves (28, 30, 47) are connected to said pilot control lines to shift said pilot control lines to a pressureless state.

5. An electronic-hydraulic control mechanism according to claim 1, wherein said electronic-hydraulic control mechanism further comprises at least one shut-off valve (35, 56) hydraulically connected to at least one of said actuation devices for removing pressurized fluid therefrom, and said at least one shut-off valve (35, 56) comprises a valve piston slidably mounted in a cylinder, a first end face side of said piston communicates with and is pressurized by said main pressure and an opposite end face of said valve piston communicates with pilot pressure supplied by said pilot control line (61, 68) to bias said valve piston into a position which interrupts discharge of fluid from the at least one actuation device.

6. An electronic-hydraulic control mechanism according to claim 5, wherein said electronic-hydraulic control mechanism further comprises a sensor to sense temperature of lube oil in the vehicle, said sensor is electrically connected to said central control unit and, depending upon the sensed temperature of the lube oil, said central control unit controls a further pressure-control valve (107) which controls said at least one shut-off valve (35, 56).

7. An electronic-hydraulic control mechanism according to claim 2, wherein at least one of said shift control valves (65) has a valve piston which is slidably mounted in a cylinder, said valve piston has opposed end faces which are selectively pressurized by the pilot control pressure, via at least one of said pilot lines (61, 68), depending upon the torque to be transmitted via said control mechanisms.

8. An electronic-hydraulic control mechanism according to claim 7, wherein at least one of said shift control valves (65) is variable to change the engaged gear of the transmission, depending upon torque to be transmitted by a corresponding one of said plurality of hydraulically engagable and disengagable components by pressurizing the valve piston therein on a circular face (64) end and on a ring-shaped actuation surface (64a) to lower the engaged gear and by pressurizing said control valve (65) only on the circular end face (64) to increase the engaged gear.

9. An electronic-hydraulic control mechanism according to claim 1, wherein said first secondary control system (36) comprises a hydraulic spring accumulator damper which is hydraulically connected to each of said pressure control valves (38, 39, 40) so as to reduce pressure vibrations in said first control system.

10. An electronic-hydraulic control mechanism according to claim 1, wherein, in a currentless state of said control mechanism, said shift valves and said pressure control valves are spring biased into a safety position in which said shift valves and said pressure control valves maintain pressurization of desired ones of said actuation devices to provide a safety state in which desired ones of said actuation devices remain actuated.

11. An electronic-hydraulic control mechanism according to claim 1, wherein said electronic-hydraulic control mechanism further comprises a monitoring device connected to said central control unit to monitor at least one of an ignition and injector system of said vehicle for errors and to report such errors to said central control unit, and said central control unit, upon receipt of errors detected by said monitoring device, adjusts at least one of said shift control valves, via said solenoid valves and said pressure control valves, to shift the transmission to an neutral condition.

* * * * *

UNITED STATES PATENT AND TRADEMARK OFFICE
CERTIFICATE OF CORRECTION

PATENT NO. : 5,417,626

DATED : May 23, 1995

INVENTOR(S) : Georg GIERER

It is certified that error appears in the above-identified patent and that said Letters Patent is hereby corrected as shown below:

Column 1, front page, replace "[21] Appl. No.: 681,570" with
 "[21] Appl. No.: 681,510"

Signed and Sealed this

Twenty-sixth Day of January, 1999

Attest:

Attesting Officer

*Acting Commissioner of Patents and Trademarks*